US012047115B2

(12) United States Patent
Yokokura et al.

(10) Patent No.: US 12,047,115 B2
(45) Date of Patent: Jul. 23, 2024

(54) POLARIZATION VARIATION MONITORING SYSTEM AND POLARIZATION VARIATION MONITORING METHOD

(71) Applicant: FUJITSU LIMITED, Kawasaki (JP)

(72) Inventors: Ichiro Yokokura, Sano (JP); Junichi Sugiyama, Kawasaki (JP); Makoto Shimizu, Oyama (JP); Toshihiro Suzuki, Kawasaki (JP); Takeshi Noma, Fukuoka (JP); Hisao Nakashima, Kawasaki (JP); Yuji Ikegami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 17/941,643

(22) Filed: Sep. 9, 2022

(65) Prior Publication Data
US 2023/0087839 A1 Mar. 23, 2023

(30) Foreign Application Priority Data

Sep. 15, 2021 (JP) .................................. 2021-150512
Aug. 29, 2022 (JP) .................................. 2022-135527

(51) Int. Cl.
*H04B 10/079* (2013.01)
(52) U.S. Cl.
CPC .............................. *H04B 10/0795* (2013.01)
(58) Field of Classification Search
None
See application file for complete search history.

(56) References Cited

U.S. PATENT DOCUMENTS

| 7,894,049 B2 * | 2/2011 | Marti Sendra ....... G01M 11/332 356/73.1 |
| 10,193,621 B2 * | 1/2019 | Kato .................. G01M 11/3136 |
| 2020/0313771 A1 * | 10/2020 | Nakashima ........ H04B 10/0799 |
| 2021/0092498 A1 | 3/2021 | Tajima et al. |
| 2023/0082206 A1 * | 3/2023 | Yokokura .......... H04B 10/0775 398/152 |
| 2023/0375378 A1 * | 11/2023 | Crickmore ......... H04B 10/0791 |

FOREIGN PATENT DOCUMENTS

| JP | 6-307896 | 11/1994 |
| JP | 8-136607 | 5/1996 |
| JP | 2021-48542 | 3/2021 |
| WO | WO-2008027257 A2 * | 3/2008 ............. H04B 10/85 |

* cited by examiner

*Primary Examiner* — Jai M Lee
(74) *Attorney, Agent, or Firm* — STAAS & HALSEY LLP

(57) ABSTRACT

First transmission device includes a first counter that generates counter value incremented in a specified cycle. Second transmission device includes a second counter that generates counter value incremented in the specified cycle. Polarization variation monitoring device acquires a first counter value generated by the first counter and a second counter value extracted by the first transmission device from a received frame transmitted from the second transmission device when the first transmission device detects polarization variation, and a third counter value generated by the second counter and a fourth counter value extracted by the second transmission device from a frame transmitted from the first transmission device when the second detector detects the polarization variation. The polarization variation monitoring device determines an occurrence position of the polarization variation based on the first counter value, the second counter value, the third counter value and the fourth counter value.

8 Claims, 15 Drawing Sheets

POLARIZATION VARIATION MONITORING SYSTEM AND POLARIZATION VARIATION MONITORING METHOD

CROSS-REFERENCE TO RELATED APPLICATIONS

This application is based upon and claims the benefit of priority of the prior Japanese Patent Application No. 2021-150512, filed on Sep. 15, 2021 and the prior Japanese Patent Application No. 2022-135527, filed on Aug. 29, 2022, the entire contents of which are incorporated herein by reference.

FIELD

The embodiments discussed herein are related to a system and method for determining a position at which a polarization variation occurs on an optical transmission path.

BACKGROUND

In optical communication systems, coherent transmission becomes mainstream due to increases in transmission rate. In the coherent transmission, signals are transmitted using a phase and polarization of light. Therefore, when polarization varies abruptly on an optical transmission path, a burst error may occur in a reception node.

Further, with increases in transmission capacity of a network, modulation schemes are adopted where the number of bits carried by each symbol is high. In addition, in optical communication using such modulation schemes, a polarization variation occurring from the vibration of an optical device, lightning strike or the like sometimes exerts a significant effect on communication quality.

Therefore, attention is directed toward techniques for determining a position at which the polarization variation occurs on the optical transmission path. For example, proposed is a configuration for detecting a type and occurrence position of a physical phenomenon occurring in a waveguide of an optical fiber and the like (e.g., Japanese Laid-open Patent Publication No. H6-307896). Proposed is a method of determining a position struck by lightning in an optical fiber or transmission line (e.g., Japanese Laid-open Patent Publication No. H8-136607). Proposed is a method of determining a position at which the polarization dependent loss occurs, while continuing communication services (e.g., Japanese Laid-open Patent Publication No. 2021-048542).

In conventional techniques, in order to determine an occurrence position of a failure (herein, variation of polarization) on an optical transmission path, huge costs may arise. For example, in the configuration described in Patent Document 1, each of a pair of nodes connected with the optical transmission path is provided with a sensor for detecting an electromagnetic wave propagating through the optical transmission path. Then, the occurrence position of the physical phenomenon is estimated, by analyzing time changes in state of the electromagnetic wave propagating bidirectionally via the optical transmission path. However, in order to actualize this configuration, it is necessary that clocks of respective nodes are mutually synchronized. For example, it is necessary to manage absolute time by installing a time synchronization mechanism such as PTP (Precision Time Protocol) in each node. Therefore, huge costs arise to determine the occurrence position of the failure. In addition, precision of determination of the occurrence position of the failure is dependent on performance of the PTP. Therefore, according to specifications of the time synchronization mechanism, it is sometimes not possible to determine the occurrence position of the failure with precision.

SUMMARY

According to an aspect of the embodiments, a polarization variation monitoring system determines an occurrence position of a polarization variation using a polarization variation monitoring device in an optical network in which a first optical transmission device and a second optical transmission device transmit frames bidirectionally via an optical transmission path. The first optical transmission device includes a first detector configured to detect a polarization variation using an optical signal received from the second optical transmission device; a first counter configured to generate a counter value that is incremented in a specified cycle; a first transmitter configured to transmit a frame including the counter value generated by the first counter to the second optical transmission device; and a first extractor configured to extract a counter value from a frame received from the second optical transmission device. The second optical transmission device includes a second detector configured to detect a polarization variation using an optical signal received from the first optical transmission device; a second counter configured to generate a counter value that is incremented in the cycle; a second transmitter configured to transmit a frame including the counter value generated by the second counter to the first optical transmission device; and a second extractor configured to extract the counter value from a frame received from the first optical transmission device. The polarization variation monitoring device includes a processor configured to acquires a first counter value indicative of the counter value generated by the first counter and a second counter value indicative of the counter value extracted by the first extractor when the first detector detects the polarization variation, and a third counter value indicative of the counter value generated by the second counter and a fourth counter value indicative of the counter value extracted by the second extractor when the second detector detects the polarization variation, and determine an occurrence position of the polarization variation based on the first counter value, the second counter value, the third counter value and the fourth counter value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
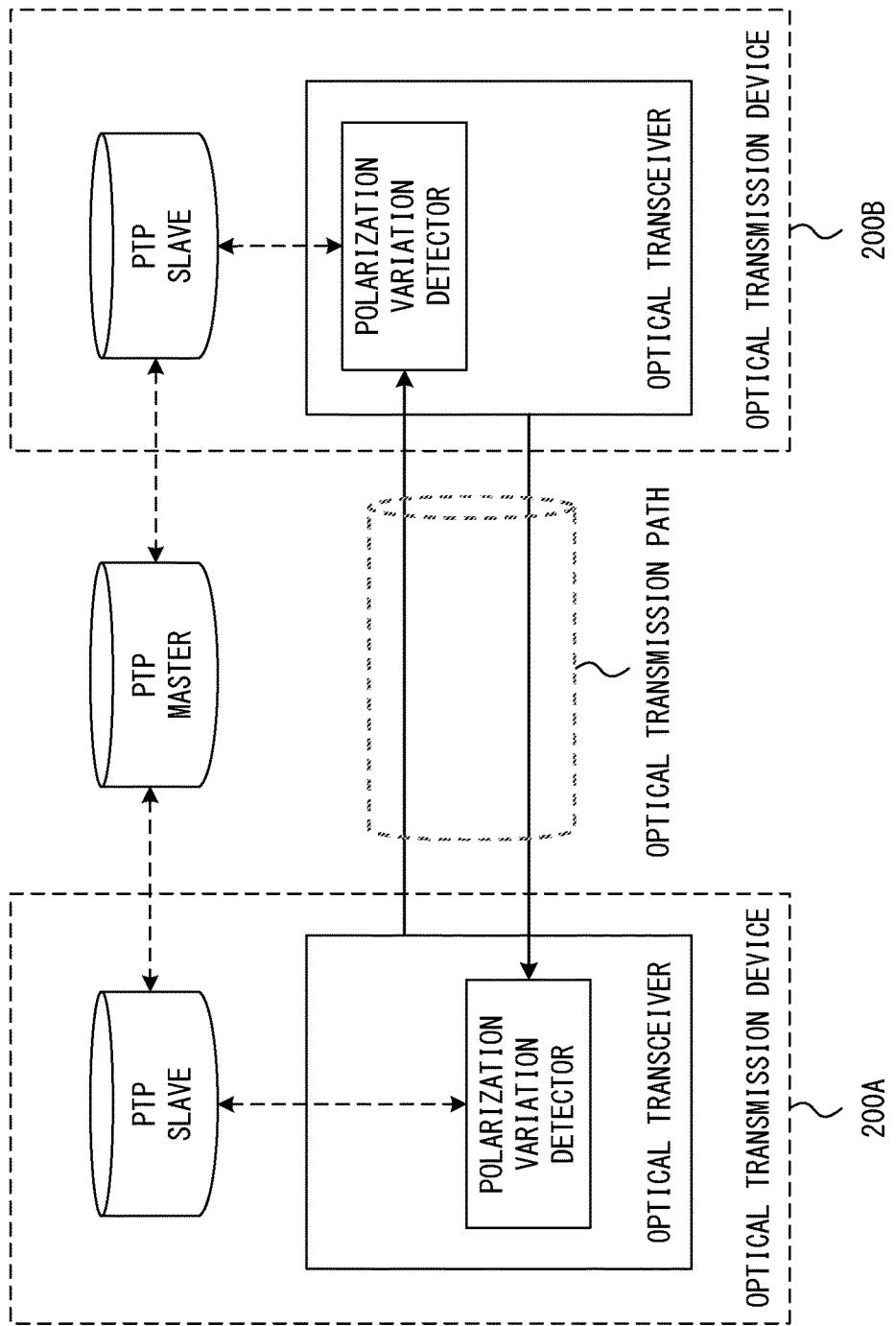
FIG. 1 illustrates an example of a method of determining an occurrence position of a polarization variation.

FIG. 1 illustrates an example of a method of determining an occurrence position of a polarization variation. In this example, optical signals are transmitted bidirectionally between an optical transmission device 200A and an optical transmission device 200B via an optical transmission path. Each of the optical transmission devices 200A and 200B is provided with a polarization variation detector for detecting a polarization variation. Further, each of the optical transmission device 200A and 200B is installed with a PTP slave. The PTP slave manages absolute time by operating in conjunction with a PTP grand master. In other words, time synchronization is established between the optical transmission devices 200A and 200B.

It is assumed that a polarization variation occurs on the optical transmission path in an optical network with the above-mentioned configuration. For example, the polarization variation may occur due to a lightning strike, vibration of an optical fiber cable or the like. The polarization variation is detected by the polarization variation detector installed in each node. At this point, each of the optical transmission devices 200A and 200B records the time when the polarization variation detector detects the polarization variation. Then, an occurrence position of the polarization variation is determined, based on a difference between the time at which the polarization variation is detected in the optical transmission device 200A and the time at which the polarization variation is detected in the optical transmission device 200B.

In addition, in this configuration, since it is necessary to install the PTP slave in each node, costs are high to determine the occurrence position of the polarization variation. Further, precision of the occurrence position of the polarization variation is dependent on performance of time synchronization. Therefore, according to specifications of the time synchronization mechanism, it may be difficult to determine the occurrence position of the polarization precision with precision.

Figure 2:
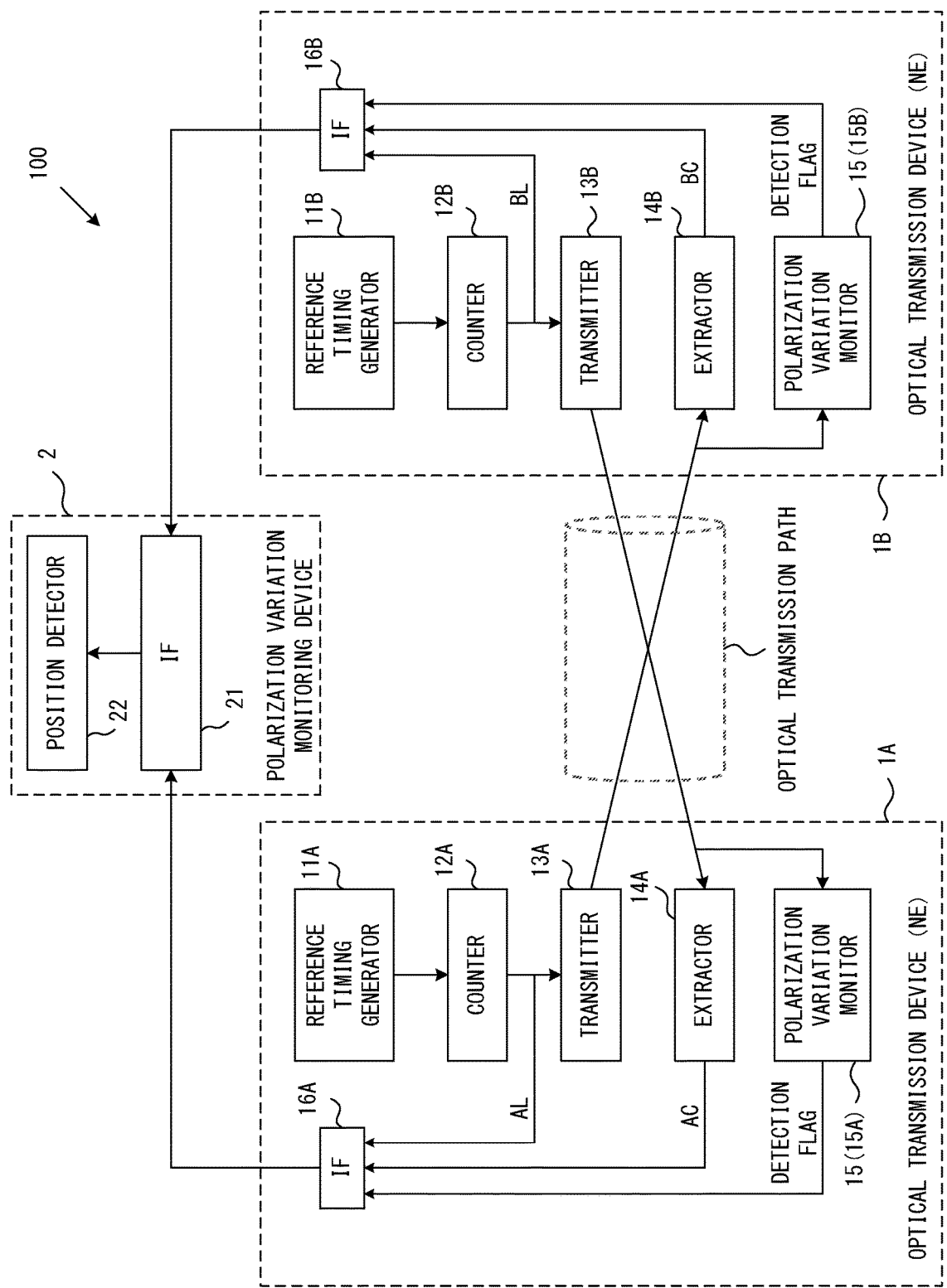
FIG. 2 illustrates an example of a polarization variation monitoring system according to an embodiment of the present invention.

FIG. 2 illustrates an example of a polarization variation monitoring system according to an embodiment of the present invention. In this embodiment, a polarization variation monitoring system 100 determines an occurrence position of a polarization variation using a polarization variation monitoring device 2, in an optical network in which frames are transmitted bidirectionally between an optical transmission device 1A and an optical transmission device 1B via an optical transmission path. In addition, in the following description, each optical transmission device may be expressed as "NE (Network Element)".

The optical transmission path includes an optical fiber for propagating optical signals from the optical transmission device 1A to the optical transmission device 1B and an optical fiber for propagating optical signals from the optical transmission device 1B to the optical transmission device 1A. In this case, it is assumed that two optical fibers have substantially the same length, and are laid on the same path. For example, two optical fibers are stored in one cable. Further, for example, OTN (Optical Transport Network) frames are transmitted between the optical transmission devices 1A and 1B.

The optical transmission device 1A is provided with a reference a timing generator 11A, a counter 12A, a transmitter 13A, an extractor 14A, a polarization variation monitor 15A, and a communication unit 16A. In addition, the optical transmission device 1A may be provided with other function, circuit or device not illustrated in FIG. 2.

The reference timing generator 11A generates a reference timing signal. In this embodiment, the reference timing signal is a clock signal with a specified frequency. The counter 12A is a free running counter and operates according to the reference timing signal. Specifically, the counter 12A outputs a counter value incremented in a specified cycle expressed by the reference timing signal. For example, the counter value generated by the counter 12A is incremented every 500 ns.

The transmitter 13A generates a transmission frame. Transmission data is stored in a payload of the frame. Further, the transmitter 13A inserts the counter value generated by the counter 12A in an unused area of an overhead (or, header) of the frame. Then, the transmitter 13A transmits the frame to the optical transmission device 1B.

The extractor 14A extracts a counter value from an overhead of a received frame. Note that configurations of the optical transmission device 1A and optical transmission device 1B are substantially the same. In other words, a counter value generated by a counter 12B of the optical transmission device 1B is inserted in an overhead of a frame transmitted to the optical transmission device 1A from the optical transmission device 1B. Accordingly, the extractor 14A extracts the counter value generated by the counter 12B of the optical transmission device 1B from the received frame.

Using the optical signal received from the optical transmission device 1B, the polarization variation monitor 15A monitors polarization variations occurring in the optical transmission path between the optical transmission device 1A and the optical transmission device 1B. In addition, for example, the polarization variation monitor 15A is installed in a receiver for recovering a symbol from a received optical signal.

Figure 3:
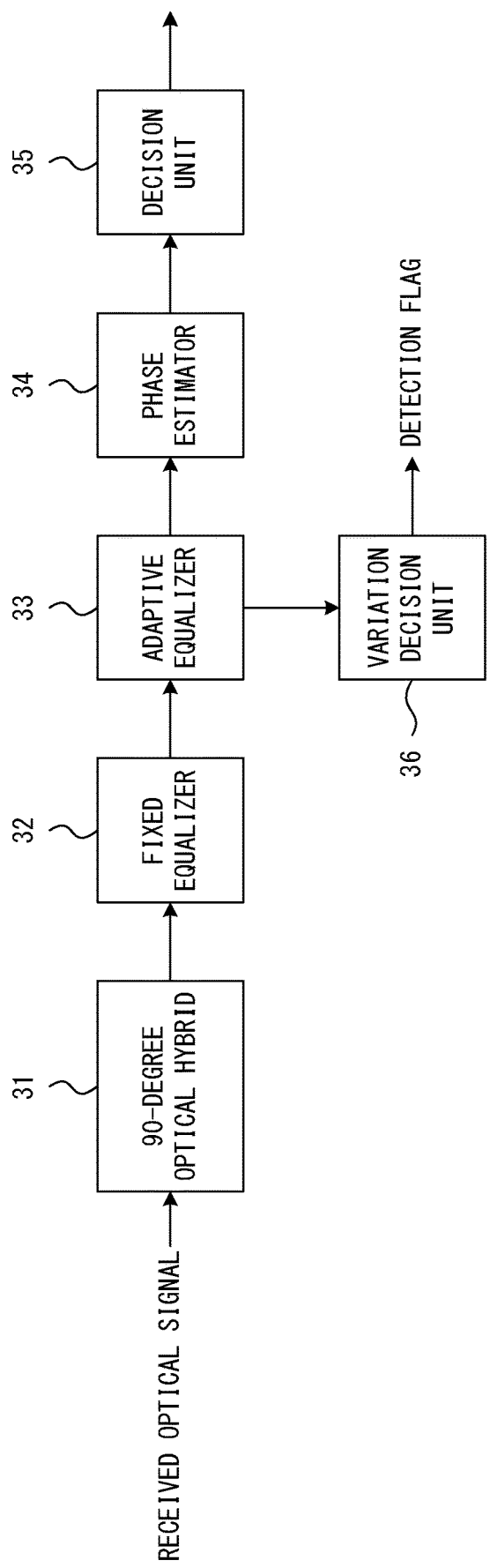
FIG. 3 illustrates an example of a receiver for recovering a symbol from a received optical signal.

FIG. 3 illustrates an example of the receiver for recovering a symbol from a received optical signal. In this example, the receiver is provided with a 90-degree optical hybrid 31, a fixed equalizer 32, an adaptive equalizer 33, a phase estimator 34, a decision unit 35 and a variation decision unit 36.

The 90-degree optical hybrid 31 generates an electric signal representing an electric field of the received optical signal, using a local light source not illustrated in the figure. The fixed equalizer 32 equalizes an output signal of the 90-degree optical hybrid 31. For example, the fixed equalizer 32 compensates for wavelength dispersion and the like. The adaptive equalizer 33 includes a digital filter such as an FIR filter, and adaptively equalizes an output signal of the fixed equalizer 32. Further, the adaptive equalizer 33 performs polarization separation. At this point, a coefficient of each tap of the digital filter is updated based on the input signal and output signal of the adaptive equalizer 33.

The phase estimator 34 compensates for a phase offset of the output signal of the adaptive equalizer 33. By this means, a phase of each symbol is estimated. Based on an output signal of the phase estimator 34, the decision unit 35 recovers data assigned to each symbol in the transmission node.

Based on the output signal of the adaptive equalizer 33 or the coefficients of the digital filter in the adaptive equalizer 33, the variation decision unit 36 monitors polarization variations occurring in the optical transmission path between the optical transmission device 1A and the optical transmission device 1B. Then, the variation decision unit 36 outputs a polarization variation detection flag when the polarization variation is larger than a specified threshold level. In other words, the polarization variation detection flag indicates that the polarization variation larger than the specified threshold level occurs in the optical transmission path between the optical transmission device 1A and the optical transmission device 1B.

Note that the variation decision unit 36 (or polarization variation monitor) is implemented by, for example, a digital signal processor that is a hardware circuit. Alternatively, the variation decision unit 36 may be implemented by a processor system that includes a processor and a memory. In this case, the processor provides functions of the variation decision unit 36 by executing a program that outputs the polarization variation detection flag upon detecting a polarization variation.

The polarization variation monitor 15A corresponds to the variation decision unit 36 illustrated in FIG. 3. Alternatively, the polarization variation monitor 15A may correspond to the 90-degree optical hybrid 31, fixed equalizer 32, adaptive equalizer 33 and variation decision unit 36. Then, the polarization variation monitor 15A outputs the polarization variation detection flag, when the polarization variation larger than the specified threshold level occurs in the optical transmission path between the optical transmission device 1A and the optical transmission device 1B.

When the polarization variation detection flag is output from the polarization variation monitor 15A, the communication unit 16A transmits a counter value output from the counter 12A and a counter value extracted by the extractor 14A to the polarization variation monitoring device 2. In other words, at timing at which the polarization variation is detected, the communication unit 16A transmits the counter value output from the counter 12A and the counter value extracted by the extractor 14A to the polarization variation monitoring device 2. At this point, the communication unit 16A may transmit the polarization variation detection flag to the polarization variation monitoring device 2 together with these counter values.

The optical transmission device 1B is provided with a reference timing generator 11B, a counter 12B, a transmitter 13B, an extractor 14B, a polarization variation monitor 15B, and a communication unit 16B. In other words, a configuration of the optical transmission device 1B is substantially the same as that of the optical transmission device 1A. Further, operation of the optical transmission device 1B is also substantially the same as that of the optical transmission device 1A.

The counter 12A installed in the optical transmission device 1A and the counter 12B installed in the optical transmission device 1B perform count operation independently of each other. However, the counter 12A and counter 12B perform the count operation in the same cycle.

The transmitter 13B inserts the counter value generated by the counter 12B in an unused area of an overhead of a transmission frame. Then, the transmitter 13B transmits the frame to the optical transmission device 1A. The extractor 14B extracts the counter value generated by the counter 12A of the optical transmission device 1A from the received frame. Using the optical signal received from the optical transmission device 1A, the polarization variation monitor 15B monitors polarization variations occurring in the optical transmission path between the optical transmission device 1A and optical transmission device 1B. Then, the polarization variation monitor 15B outputs the polarization variation detection flag, when the polarization variation larger than the specified threshold level occurs in the optical transmission path between the optical transmission device 1A and the optical transmission device 1B. When the polarization variation detection flag is output from the polarization variation monitor 15B, the communication unit 16B transmits the counter value generated by counter 12B and the counter value extracted by the extractor 14B to the polarization variation monitoring device 2.

In the following description, the counter value generated by the counter 12A in the optical transmission device 1A may be referred to as "local station counter value AL" or simply "AL". The counter value generated by the counter 12B in the optical transmission device 1B may be referred to as "local station counter value BL" or simply "BL". The counter value extracted by the extractor 14A from the received frame in the optical transmission device 1A may be referred to as "correspondent station counter value AC" or simply "AC". The counter value extracted by the extractor 14B from the received frame in the optical transmission device 1B may be referred to as "correspondent station counter value BC" or simply "BC".

The polarization variation monitoring device 2 is provided with a communication unit 21 and position detector 22. The communication unit 21 receives the local station counter value AL and the correspondent station counter value AC from the optical transmission device 1A. Further, the communication unit 21 receives the local station counter value BL and the correspondent station counter value BC from the optical transmission device 1B. Note that the communication unit 21 is an example of an acquiring unit that acquires a first counter value indicative of the counter value generated by the counter 12A and a second counter value indicative of the counter value extracted by the extractor 14A when the polarization variation monitor 15A detects the polarization variation, and a third counter value indicative of the counter value generated by the counter 12B and a fourth counter value indicative of the counter value extracted by the extractor 14B when the polarization variation monitor 15B detects the polarization variation.

Based on the local station counter value AL, the correspondent station counter value AC, the local station counter value BL and the correspondent station counter value BC, the position detector 22 determines an occurrence position of the polarization variation. Note that, for example, the position detector 22 is implemented by a processor system including a processor and a memory. In this case, a program to determine the occurrence position of the polarization variation is stored in the memory. The processor executes the program and thereby determine the occurrence position of the polarization variation.

Figure 4:
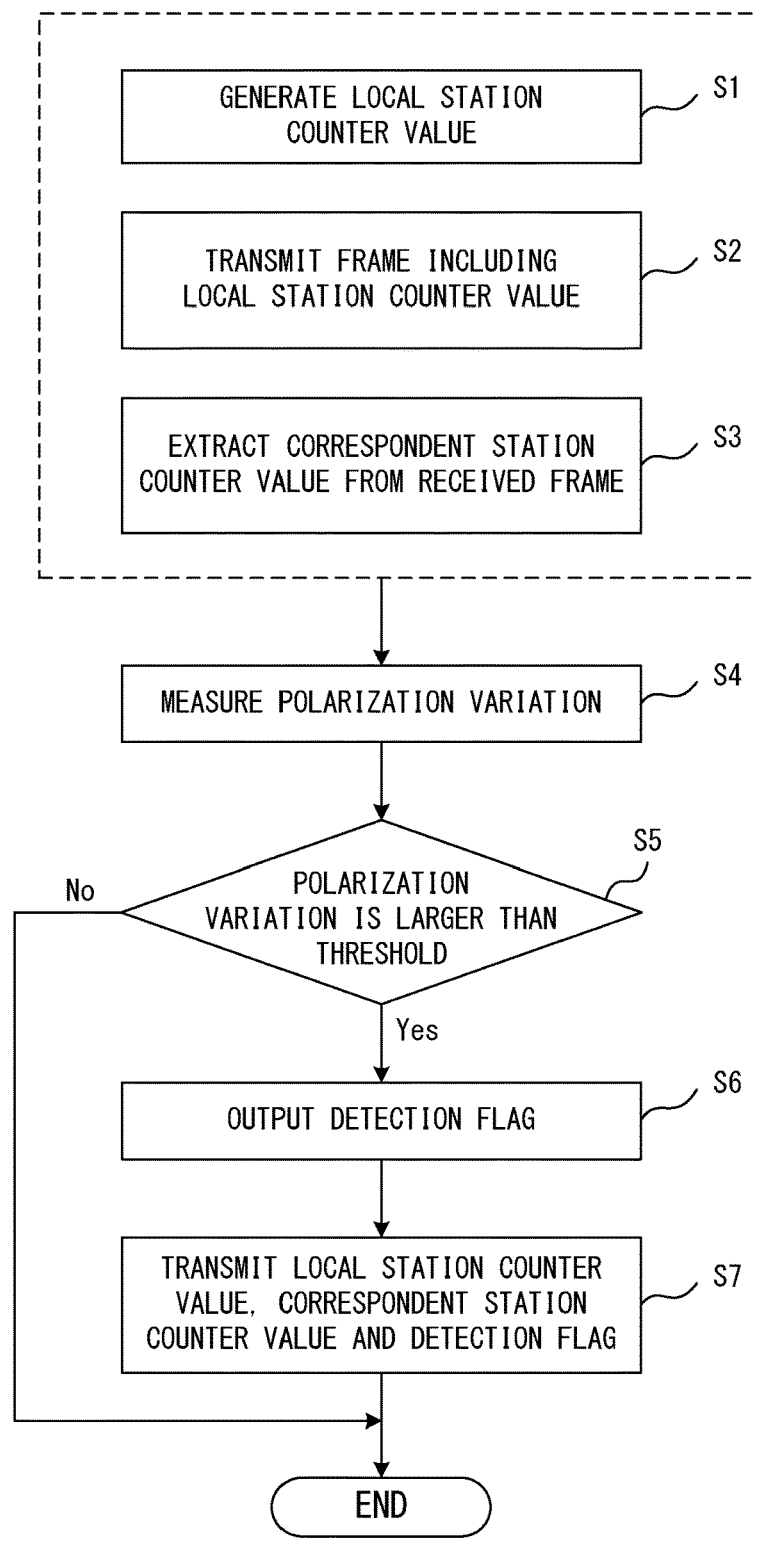
FIG. 4 is a flowchart illustrating an example of processing executed in an optical transmission device.

FIG. 4 is a flowchart illustrating an example of processing executed in the optical transmission device. The following description will explain the processing executed in the optical transmission device 1A. Note that the processing executed in the optical transmission device 1A and the processing executed in the optical transmission device 1B are substantially the same as each other.

In S1, the reference timing generator 11A and the counter 12A generate the counter value (local station counter value AL) that is incremented in a specified cycle. As one example, not limited particularly, the counter value is incremented at intervals of 500 ns.

In S2, the transmitter 13A transmits the frame including the counter value generated by the counter 12A to the optical transmission device 1B. For example, the counter value is inserted in an unused area inside the overhead of the transmission frame.

In S3, the extractor 14A extracts the counter value from the overhead of the received frame. In other words, the extractor 14A acquires the counter value (correspondent station counter value AC) generated by the counter 12B of the optical transmission device 1B.

In S4, using the optical signal received from the optical transmission device 1B via the optical transmission path, the polarization variation monitor 15A monitors polarization variations occurring in the optical transmission path between the optical transmission device 1A and the optical transmission device 1B. For example, the polarization variation is measured by the variation decision unit 36 illustrated in FIG. 3. In this case, based on the output signal of the adaptive equalizer 33 or the coefficients of the digital filter in the adaptive equalizer 33, the variation decision unit 36 measures the polarization variation. Note that, for example, the variation decision unit 36 monitors the polarization variation in the same cycle as the cycle in which the counter 12A is incremented. Alternatively, the variation decision unit 36 may monitor the polarization variation in a cycle shorter than the cycle in which the counter 12A is incremented.

In S5, the polarization variation monitor 15A compares the polarization variation measured in S4 with a specified threshold. For example, based on a simulation or measurement, the threshold may be determined based on an error of the recovered data. When the polarization variation measured in S4 is larger than the threshold, in S6, the polarization variation monitor 15A outputs the polarization variation detection flag. The polarization variation detection flag indicates that the polarization variation larger than the specified threshold level occurs in the optical transmission path between the optical transmission device 1A and the optical transmission device 1B. On the other hand, when the polarization variation is smaller than the threshold, the polarization variation monitor 15A does not output the polarization variation detection flag.

In S7, the communication unit 16A transmits, to the polarization variation monitoring device 2, the counter value (i.e., local station counter value AL) generated in S1 and the counter value (i.e., correspondent station counter value AC) acquired in S3. Accordingly, the polarization variation monitoring device 2 is notified of the local station counter value AL and the correspondent station counter value AC at timing at which the polarization variation is detected in the optical transmission device 1A. At this point, the communication unit 16A transmits the polarization variation detection flag to the polarization variation monitoring device 2 together with these counter values.

Thus, when the polarization variation larger than the threshold is detected, the optical transmission device 1A transmits, to the polarization variation monitoring device 2, the local station counter value AL and correspondent station counter value AC at timing at which the polarization variation is detected. Similarly, when the polarization variation larger than the threshold is detected, the optical transmission device 1B transmits, to the polarization variation monitoring device 2, the local station counter value BL and the correspondent station counter value BC at timing at which the polarization variation is detected.

Figure 5:
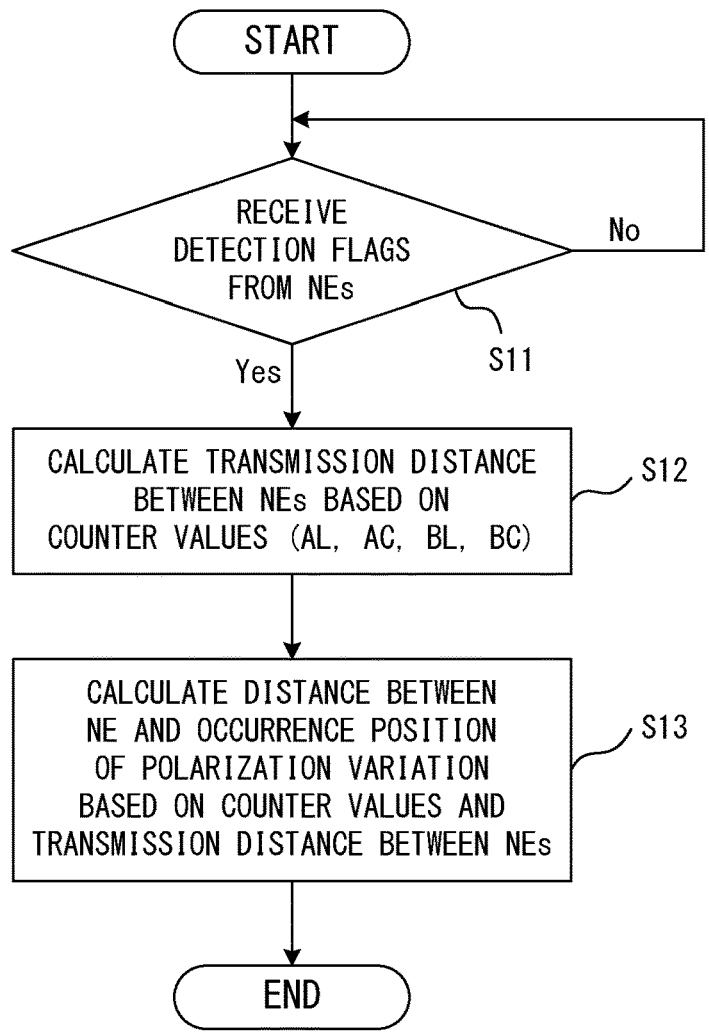
FIG. 5 is a flowchart illustrating an example of processing of a polarization variation monitoring device.

FIG. 5 is a flowchart illustrating an example of processing of the polarization variation monitoring device 2. As explained with reference to FIG. 4, when each optical transmission device detects the polarization variation larger than the threshold, it is assumed that the optical transmission device transmits the polarization variation detection flag and counter values to the polarization variation monitoring device 2.

In S11, the communication unit 21 waits for the polarization variation detection flag transmitted from each of the optical transmission devices 1A and 1B. When the communication unit 21 receives the polarization variation detection flag from both of the optical transmission devices 1A and 1B, the processing of the polarization variation monitoring device 2 proceeds to S12. Here, when the communication unit 21 receives the polarization variation detection flag from the optical transmission device 1A, the communication unit 21 also receives the local station counter value AL and the correspondent station counter value AC from the optical transmission device 1A. Similarly, when the communication unit 21 receives the polarization variation detection flag from the optical transmission device 1B, the communication unit 21 also receives the local station counter value BL and the correspondent station counter value BC from the optical transmission device 1B.

When the communication unit 21 receives the polarization variation detection flag from both of the optical transmission devices 1A and 1B, the polarization variation monitoring device 2 executes processing of S12 and S13. However, the polarization variation monitoring device 2 does not need to execute the processing of S12 and S13 immediately after receiving the polarization variation detection flag in the communication unit 21. For example, when the communication unit 21 receives the polarization variation detection flag, the polarization variation monitoring device 2 stores the counter values (AL, AC, BL, BC) received from the optical transmission devices 1A and 1B in a memory not illustrated in the figure. Then, when necessary, the polarization variation monitoring device 2 may acquire the counter values from the memory, and using these counter values, execute the processing of S12 and S13.

In S12, based on the counter values (AL, AC, BL, BC), the position detector 22 calculates a transmission distance between the optical transmission devices 1A and 1B. Then, in S13, based on the counter values and the transmission distance calculated in S12, the position detector 22 calculates a distance between the optical transmission device 1A or the optical transmission device 1B and an occurrence position of the polarization variation.

Figure 6:
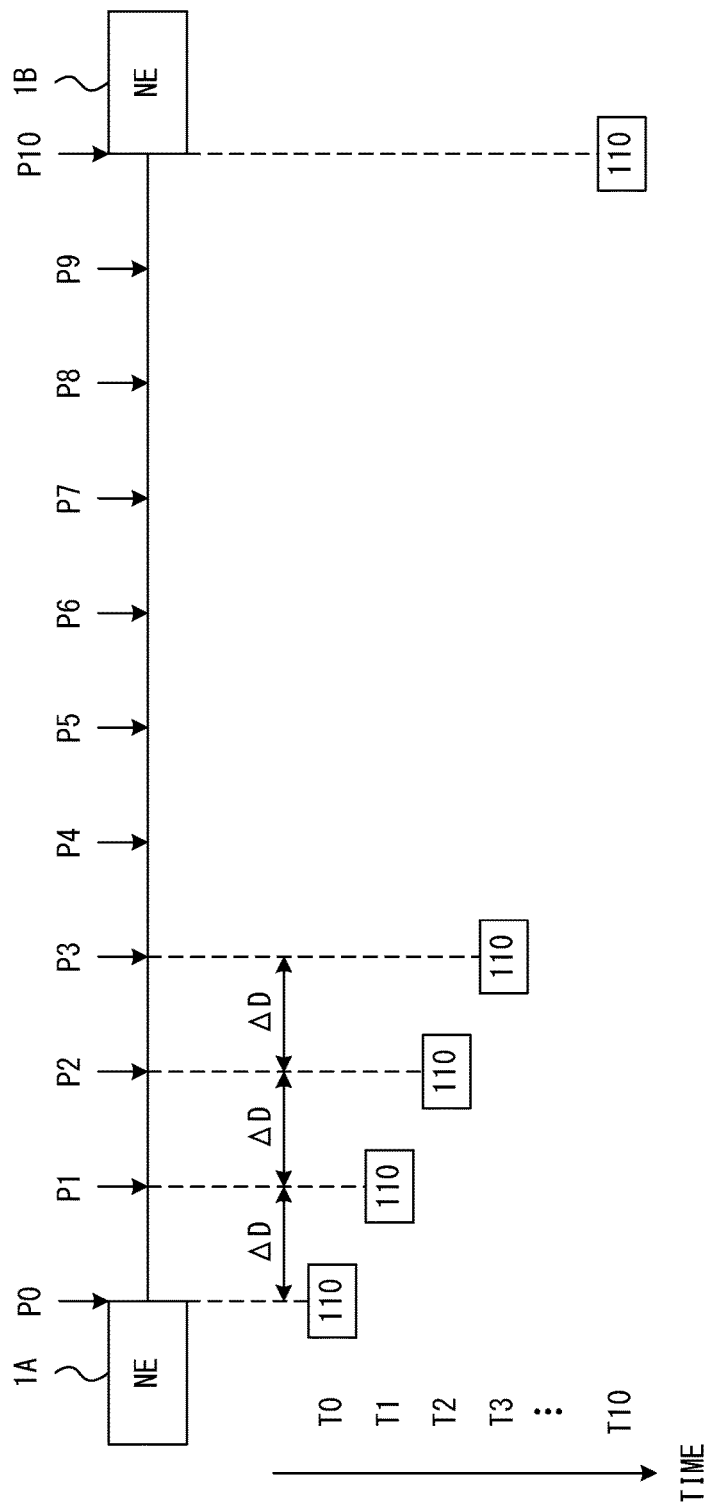
FIGS. 6-8 illustrate an example of transmission of frames between optical transmission devices.
Figure 7:
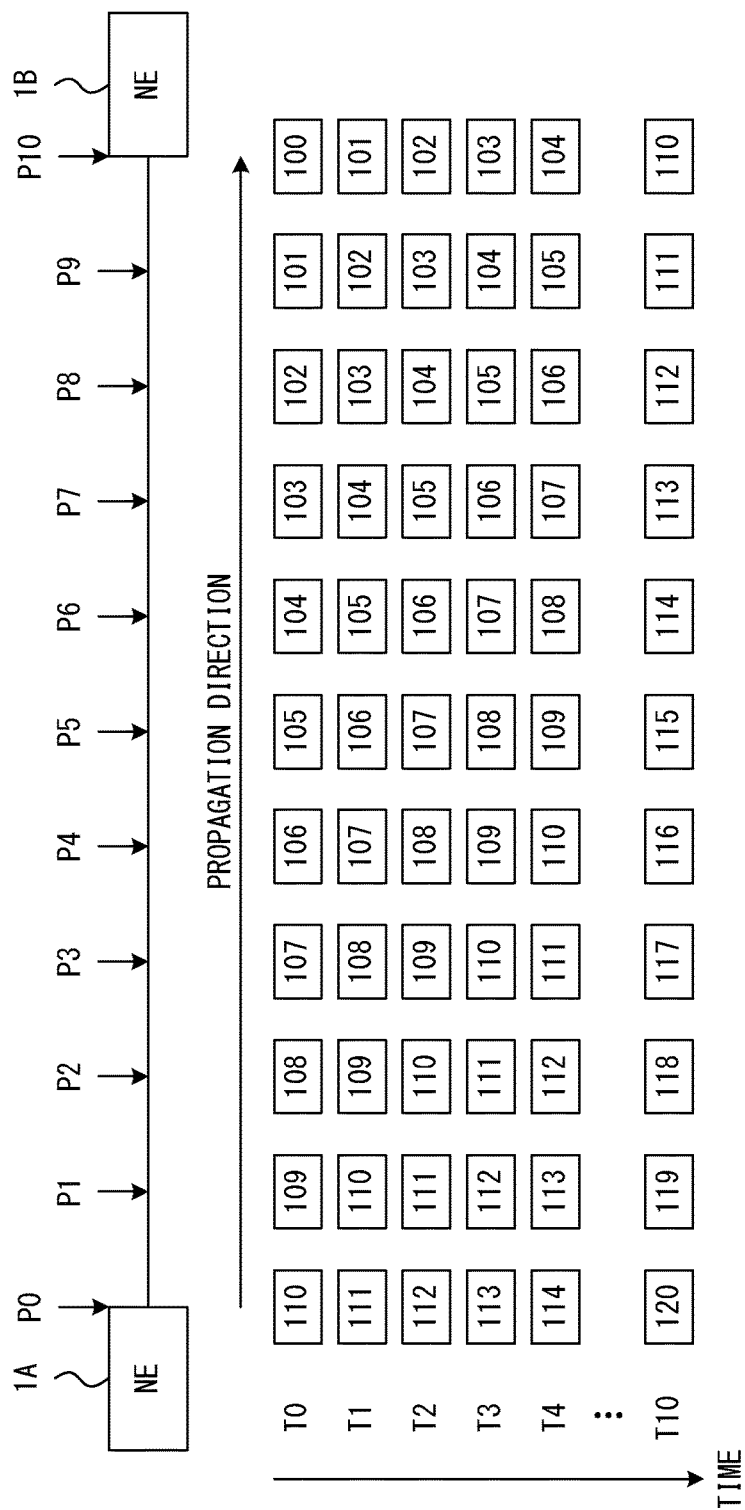
Figure 8:
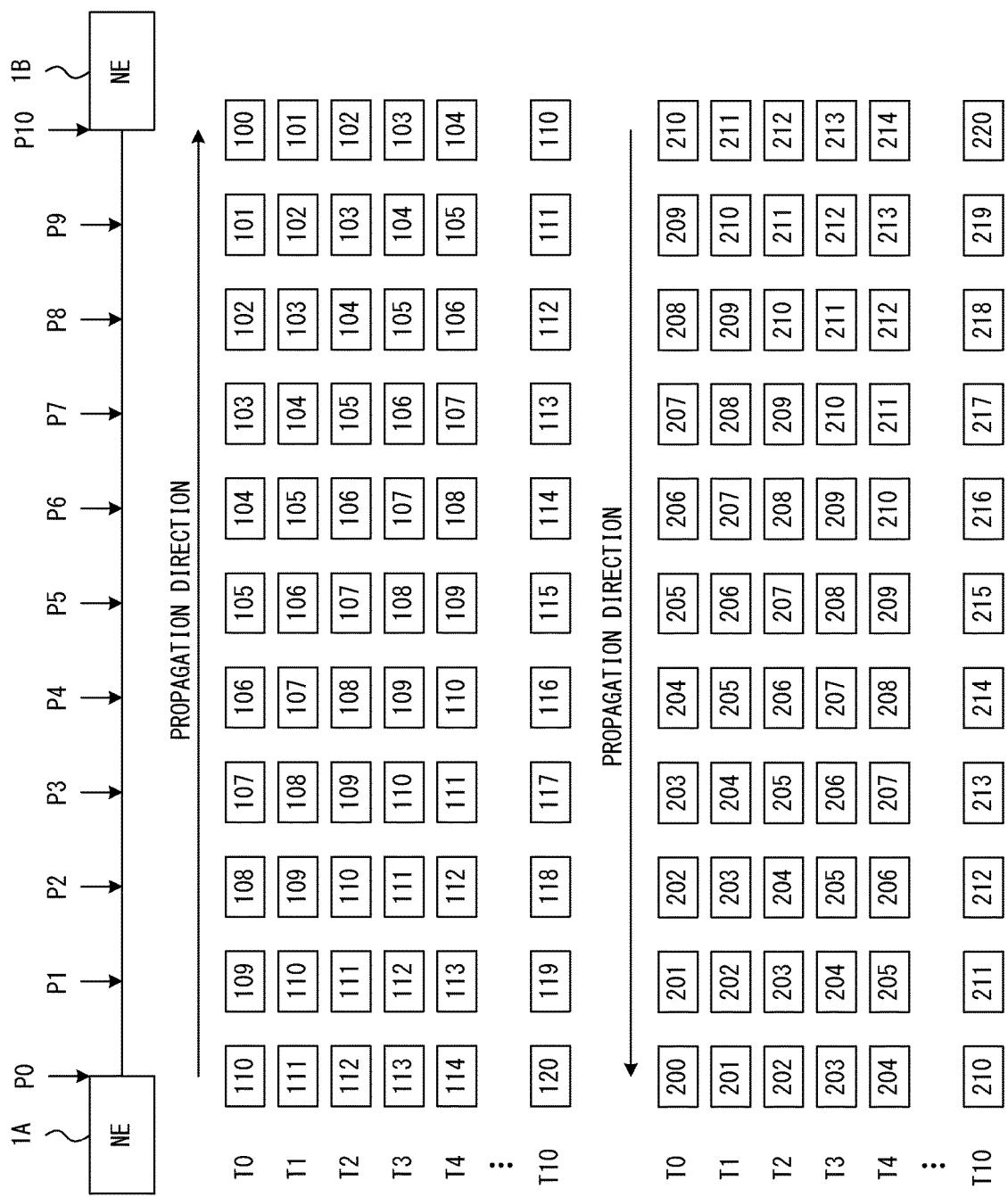

FIGS. 6-8 illustrate an example of transmission of frames between the optical transmission devices 1A and 1B. Herein, each of the counters 12A and 12B performs count operation in a specified cycle ΔT. In this embodiment, the cycle ΔT is 500 ns. In other words, the counters 12A and 12B respectively perform the count operation at intervals of 500 ns.

At time T0, it is assumed that "110" is the local station counter value ΔL output from the counter 12A installed in the optical transmission device 1A. The optical transmission device 1A transmits a frame including the counter value to the optical transmission device 1B.

The frame transmitted from the optical transmission device 1A propagates by a distance ΔD in the optical fiber during a period ΔT. In other words, at time T1 (T0+ΔT), the frame arrives at a position (P1, in FIG. 6) spaced ΔD away from the optical transmission device 1A. Herein, in this embodiment, ΔT is 500 ns. Further, it is assumed that the speed of light is 300,000 km/sec, and that a refractive index of the optical fiber is 1.43. In this case, ΔD is about 100 m.

Thus, the transmission frame propagates by the distance ΔD during the period ΔT. In other words, the transmission frame passes through a position P2 (position spaced 2ΔD away from the optical transmission device 1A) at time T2 (T0+2ΔT), and passes through a position P3 (position spaced 3ΔD away from the optical transmission device 1A) at time T3 (T0+3ΔT). Then, in this embodiment, the transmission frame arrives at the optical transmission device 1B at time T10 (T0+10ΔT). Herein, ΔD is 100 m. Accordingly, a transmission distance between the optical transmission devices 1A and 1B is 1 km.

The counter 12A performs count operation in the cycle ΔT. In other words, the local station counter value ΔL output from the counter 12A is incremented in the cycle ΔT. For example, as illustrated in FIG. 7, in the case where the local station counter value ΔL generated at time T0 is "110", the local station counter value ΔL generated at time T1 (T0+ΔT) is "111", and the local station counter value ΔL generated at time T2 (T0+2ΔT) is "112". Then, every time a new counter value is generated, the optical transmission device 1A generates a frame including a corresponding counter value to transmit to the optical transmission device 1B. Note that in the following description, a frame in which a counter value stored in the overhead is "i" may be called a "frame i".

As described above, each frame transmitted from the optical transmission device 1A propagates by the distance ΔD in the optical fiber during the period ΔT. Accordingly, for example, a frame 110 transmitted from the optical transmission device 1A at time T0 arrives at the position P1 at time T1, and arrives at the position P2 at time T2. Further, a frame 111 transmitted from the optical transmission device 1A at time T1 arrives at the position P1 at time T2, and arrives at the position P2 at time T3.

Accordingly, at time T1 (i=0, 1, 2 . . . ), the frame is positioned in each of positions P0 to P10. For example, at time T1, frames 111 to 101 are respectively positioned in the positions P0 to P10. Further, at time T2, frames 112 to 102 are respectively positioned in the positions P0 to P10. Note that the position P0 and position P10 respectively indicate positions of the optical transmission device 1A and optical transmission device 1B.

As in the optical transmission device 1A, the optical transmission device 1B generates a frame including the local station counter value BL generated by the counter 12B to transmit to the optical transmission device 1A. Here, the counter 12A installed in the optical transmission device 1A and the counter 12B installed in the optical transmission device 1B perform count operation independently of each other. Therefore, counter values generated by the counters 12A and 12B at an arbitrary point of time are usually different from each other.

In the example illustrated in FIG. 8, at time T0, the local station counter value AL generated by the counter 12A in the optical transmission device 1A is "110", and the local station counter value BL generated by the counter 12B in the optical transmission device 1B is "210". Further, at time T1, the local station counter value ΔL generated by the counter 12A in the optical transmission device 1A is "111", and the local station counter value BL generated by the counter 12B in the optical transmission device 1B is "211".

The frame transmitted from the optical transmission device 1B propagates by the distance ΔD in the optical fiber during the period ΔT from the optical transmission device B toward the optical transmission device 1A. Accordingly, for example, a frame 210 transmitted from the optical transmission device 1B at time T0 arrives at the position P9 at time T1, and arrives at the position P8 at time T2. Further, a frame 211 transmitted from the optical transmission device 1B at time T1 arrives at the position P9 at time T2, and arrives at the position P8 at time T3. Accordingly, for example, at time T1, frames 211 to 201 are respectively positioned in positions P10 to P0. Further, at time T2, frames 212 to 202 are respectively positioned in the positions P10 to P0.

In the optical network for performing above-mentioned frame transmission, when a polarization variation occurs in the optical transmission path between the optical transmission devices 1A and 1B, the optical transmission devices 1A and 1B respectively detect the polarization variation. In other words, according to the flowchart illustrated in FIG. 4, each of the optical transmission devices 1A and 1B detects the polarization variation. As a result, each of the optical transmission devices 1A and 1B outputs a pair of counter values. Specifically, the optical transmission device 1A outputs the local station counter value ΔL generated by the counter 12A at the time the polarization variation is detected, and the correspondent station counter value AC extracted from the received frame at the time the polarization variation is detected. Similarly, the optical transmission device 1B outputs the local station counter value BL generated by the counter 12B at the time the polarization variation is detected, and the correspondent station counter value BC extracted from the received frame at the time the polarization variation is detected. Note that timing at which the optical transmission device 1A detects the polarization variation and timing at which the optical transmission device 1B detects the polarization variation may be the same as each other, or may be different from each other. Further, in addition to the counter values, each of the optical transmission devices 1A and 1B outputs the polarization variation detection flag.

In this embodiment, when the optical transmission device 1A detects the polarization variation, it is assumed that the optical transmission device 1A outputs the counter values described below.

Local station counter value AL: 115
Correspondent station counter value AC: 205

Further, when the optical transmission device 1B detects the polarization variation, it is assumed that the optical transmission device 1B outputs the counter values described below.

Local station counter value BL: 219
Correspondent station counter value BC: 109

According to the flowchart illustrated in FIG. 5, the polarization variation monitoring device 2 determines an occurrence position of the polarization variation. In other words, upon receiving the polarization variation detection flag from both of the optical transmission devices 1A and 1B, the position detector 22 illustrated in FIG. 2 executes S12 and S13, and thereby determines the occurrence position of the polarization variation.

In S12 illustrated in FIG. 5, based on the counter values (AL, AC, BL, BC) received from the optical transmission devices 1A and 1B together with the polarization variation detection flags, the position detector 22 calculates a transmission distance between the optical transmission devices 1A and 1B. In this example, the transmission distance is calculated using the number of steps. Herein, the number of steps indicates the number of times the counters 12A or 12B is incremented. Accordingly, a time corresponding to one step is ΔT (500 ns, in this embodiment), and a distance corresponding to one step is ΔD (100 m, in this embodiment).

In the case where the number of steps representing the transmission distance between the optical transmission devices 1A and 1B is "x", the number x of steps is expressed by Formula 1 using the counter values (AL, AC, BL, BC).

$$x = \frac{|(BL - BC) - (AC - AL)|}{2} \quad (1)$$

In other words, calculated are a first difference value indicating a difference between the correspondent station counter value AC and the local station counter value AL obtained in the optical transmission device 1A, and a second difference value indicating a difference between the local station counter value BL and the correspondent station counter value BC obtained in the optical transmission device 1B. Then, the number x of steps is expressed by dividing an absolute value of a difference between the first difference value and the second difference value by "2".

Accordingly, when four counter values are given to the Formula 1, the number x of steps representing the transmission distance between the optical transmission devices 1A and 1B is obtained. Specifically, the number x of steps is calculated by Formula 2, and the calculated result is "10".

$$x = \frac{|(219 - 109) - (205 - 115)|}{2} = 10 \quad (2)$$

The distance corresponding to one step is ΔD, and is 100 m in this embodiment. Accordingly, in this case, the transmission distance between the optical transmission devices 1A and 1B is 1000 m.

Note that when the transmission distance between a pair of optical transmission devices is long, it is necessary to increase the number of bits of the counters 12A and 12B. For example, by using a 16-bit counter and considering full-count rounds, it is possible to apply up to about 2000 km.

Next, in S13 illustrated in FIG. 5, based on the counter values (AL, AC, BL, BC) received from the optical transmission devices 1A and 1B, the position detector 22 determines the occurrence position of the polarization variation. Here, the position detector 22 may determine the occurrence position of the polarization variation based on a part of four counter values received from the optical transmission devices 1A and 1B. For example, the position detector 22 may determine the occurrence position of the polarization variation based on the local station counter value obtained in one optical transmission device, and the correspondent station counter value obtained in the other optical transmission device.

Figure 9:
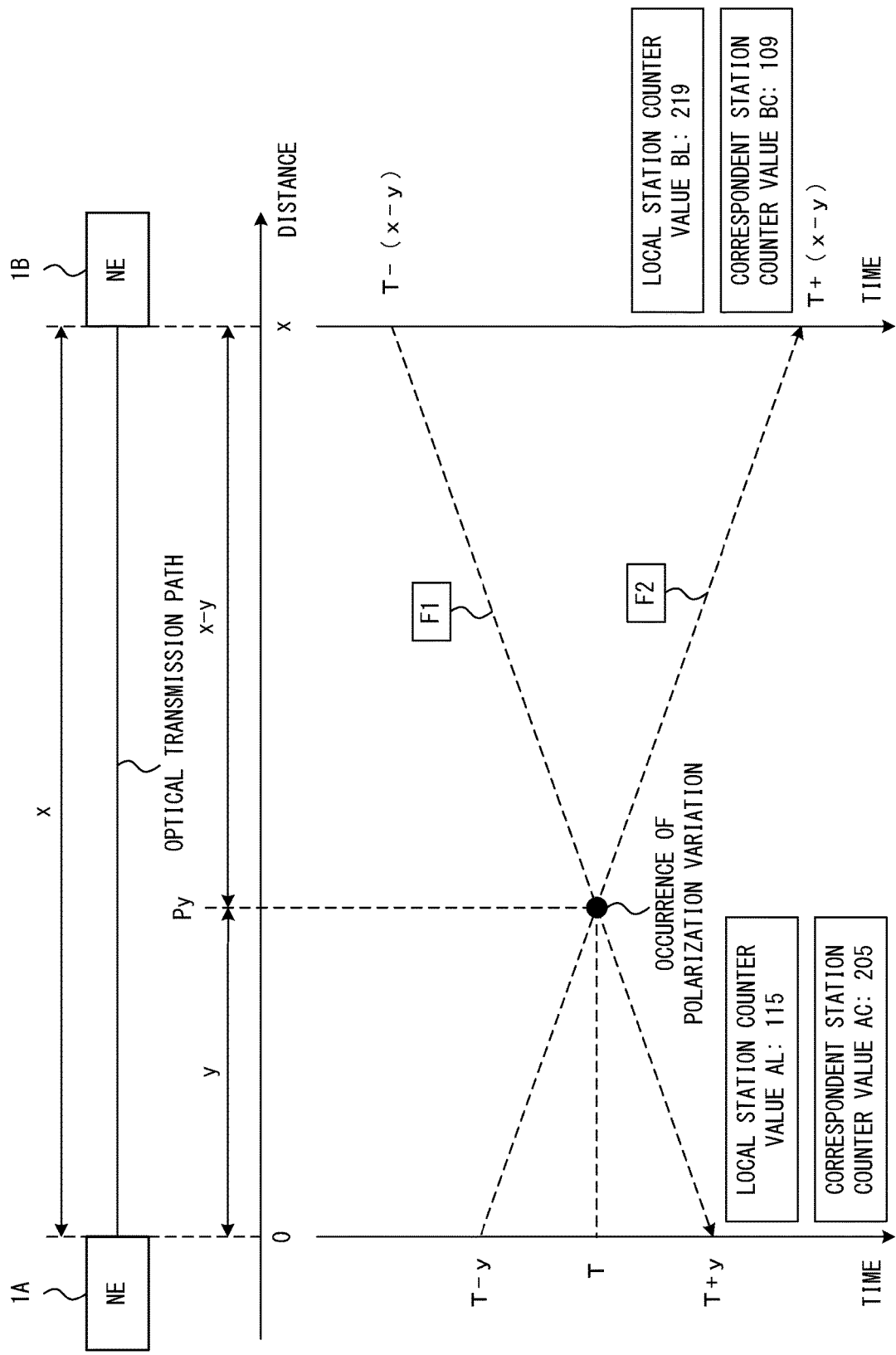
FIG. 9 illustrates an example of a method of determining an occurrence position of a polarization variation in the embodiment of the present invention.

FIG. 9 illustrates an example of the method of determining the occurrence position of the polarization variation. In the following description, the time and distance are expressed, using the above-mentioned number of steps. In other words, one step represents the cycle ΔT in which the counters 12A and 12B are incremented. Further, one step represents the distance ΔD that the frame is transmitted in the optical fiber for the period ΔT. In this embodiment, the position detector 22 determines the occurrence position of the polarization variation based on the correspondent station counter value AC extracted from the received frame in the optical transmission device 1A, and the local station counter value BL generated by the counter 12B in the optical transmission device 1B.

In this embodiment, it is assumed that the polarization variation occurs in a position Py on the optical transmission path at time T. The distance between the optical transmission device 1A and the position Py is "y". Herein, it is assumed that the transmission distance between the optical transmission devices 1A and 1B is represented by "x". The transmission distance between the optical transmission device 1B and the position Py is "x-y". In addition, x and y are respectively integers indicating the number of steps.

It is assumed that a frame F1 transmitted from the optical transmission device 1B passes through the position Py at time T. In other words, the frame F1 undergoes an effect of the polarization variation in the position Py. Herein, the distance between the optical transmission device 1B and the position Py is "x-y". Accordingly, it is considered that the frame F1 is transmitted from the optical transmission device 1B at time "T-(x-y)". Further, since the distance between the position Py and the optical transmission device 1A is "y", the frame F1 arrives at the optical transmission device 1A at time "T+y".

The optical transmission device 1A detects the polarization variation when receiving the frame F1. In other words, the optical transmission device 1A detects the polarization variation at time "T+y". By doing this, the optical transmission device 1A extracts the counter value (i.e., correspondent station counter value AC) from the overhead of the frame F1. Then, the optical transmission device 1A transmits the extracted correspondent station counter value AC to the polarization variation monitoring device 2. Herein, the frame F1 is transmitted from the optical transmission device 1B at time "T-(x-y)". Accordingly, the correspondent station counter value AC is a counter value generated by the counter 12B of the optical transmission device 1B at time "T-(x-y)".

Similarly, it is assumed that a frame F2 transmitted from the optical transmission device 1A passes through the position Py at time T. In other words, the frame F2 undergoes the effect of the polarization variation in the position Py. Herein, the distance between the position Py and the optical transmission device 1B is "x-y". Accordingly, the frame F2 arrives at the optical transmission device 1B at time "T+(x-y)".

The optical transmission device 1B detects the polarization variation when receiving the frame F2. In other words, the optical transmission device 1B detects the polarization variation at time "T+(x-y)". Then, the optical transmission device 1B transmits the counter value (i.e., local station counter value BL) generated by the counter 12B to the polarization variation monitoring device 2. Herein, the frame F2 arrives at the optical transmission device 1B at time "T+(x-y)". Accordingly, the local station counter value BL is a counter value generated by the counter 12B of the optical transmission device 1B at time "T+(x-y)".

The polarization variation monitoring device 2 determines the occurrence position of the polarization variation, based on the correspondent station counter value AC received from the optical transmission device 1A and the local station counter value BL received from the optical transmission device 1B. Herein, as described above, the correspondent station counter value AC is the counter value generated by the counter 12B of the optical transmission device 1B at time "T-(x-y)". The local station counter value BL is the counter value generated by the counter 12B of the optical transmission device 1B at time "T+(x-y)". Accordingly, the local station counter value BL is larger than the correspondent station counter value AC by "2(x-y)". In other words, the following Formula 3 is satisfied.

$$BL-AC=2(x-y) \quad (3)$$

Then, by expanding the Formula 3, Formula 4 is obtained.

$$y = \frac{AC - (BL - 2x)}{2} \quad (4)$$

Using the Formula 4, the polarization variation monitoring device 2 determines the occurrence position of the polarization variation. In this embodiment, as illustrated in FIG. 9, the correspondent station counter value AC and the local station counter value BL are respectively "205" and "219". Further, the number x of steps representing the transmission distance between the optical transmission devices 1A and 1B is "10". Accordingly, a distance y between the optical transmission device 1A and the occurrence position Py of the polarization variation is "3". Herein, in this embodiment, one step represents 100 m. Accordingly, the polarization variation monitoring device 2 outputs a message indicating that "the polarization variation occurs at a position spaced 300 m away from the optical transmission device 1A".

As described above, in the polarization variation monitoring method according to the embodiment of the present invention, the occurrence position of the polarization variation is determined, using the counter values of the free-running counters installed in respective nodes (in this embodiment, optical transmission devices 1A and 1B). Herein, the free-running counters installed in respective nodes perform count operation independently of each other. In other words, it is not necessary to establish time synchronization between the nodes. For example, it is not necessary to install the time synchronization mechanism such as PTP in each node. Therefore, according to the embodiment of the present invention, it is possible to determine the occurrence position of the polarization variation at low cost with simple configuration.

In the above-described embodiment, the cycle ΔT to increment the counters 12A and 12B is 500 ns, and precision of the determined position is about 100 m. In addition, as the cycle to increment the counters 12A and 12B is shorter, the precision of a determined position is higher. Thus, according to the embodiment of the present invention, it is possible to determine the occurrence position of the polarization variation with high precision.

Variation

In the embodiment illustrated in FIG. 5, the transmission distance between the optical transmission devices is calculated when the polarization variation is detected, but the present invention is not limited to this procedure. In other words, the transmission distance between the optical transmission devices is not changed substantially, and therefore, may be measured in advance. Alternatively, in the case where the procedure illustrated in FIG. 5 was executed in the past, it may be possible to use the transmission distance calculated in the past.

In the embodiment illustrated in FIG. 9, the occurrence position of the polarization variation is determined using the correspondent station counter value AC extracted in the optical transmission device 1A and the local station counter value BL generated in the optical transmission device 1B, but the present invention is not limited to this procedure. In other words, the polarization variation monitoring device 2 may determine the occurrence position of the polarization variation, using the correspondent station counter value BC extracted in the optical transmission device 1B and the local station counter value AL generated in the optical transmission device 1A. Further, the polarization variation monitoring device 2 may determine the occurrence position of the polarization variation, using four counter values (AL, AC, BL, BC).

Figure 10:
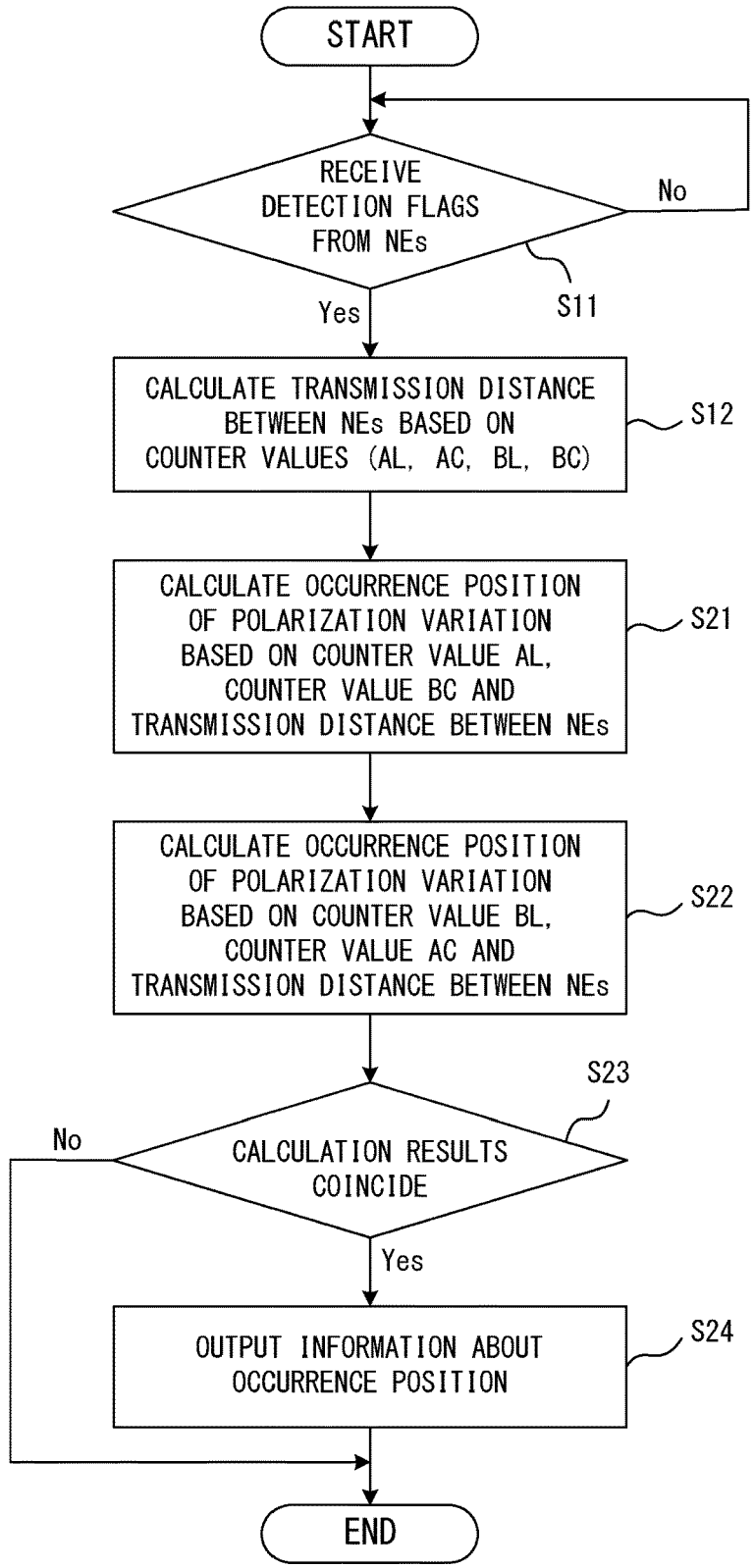
FIG. 10 is a flowchart illustrating a variation of the processing of the polarization variation monitoring device.

FIG. 10 is a flowchart illustrating the variation of the processing of the polarization variation monitoring device 2. Note that the processing of S11 and S12 is the same as in FIGS. 5 and 10. Accordingly, after calculating the transmission distance between the optical transmission devices 1A and 1B, the device 2 executes the processing of S21 to S24.

In S21, the position detector 22 determines an occurrence position of a polarization variation, using the local station counter value AL generated in the optical transmission device 1A and the correspondent station counter value BC extracted in the optical transmission device 1B. In S22, the position detector 22 determines an occurrence position of a polarization variation, using the local station counter value BL generated in the optical transmission device 1B and the correspondent station counter value AC extracted in the optical transmission device 1A.

In S23, the position detector 22 compares the position determined in S21 and the position determined in S22. When these two positions coincident with each other, in S24, the position detector 22 outputs information indicative of the position determined in S21 and S22. According to this method, the precision is increased in the occurrence position of the polarization variation. Note that "coincident" includes a case where a difference between two positions is sufficiently small.

In the embodiment illustrated in FIG. 2, the polarization variation monitoring device 2 is provided independently of the optical transmission devices (1A, 1B), but the present invention is not limited to this configuration. In other words, the polarization variation monitoring device 2 may be installed in one of the optical transmission devices 1A and 1B.

Figure 11:
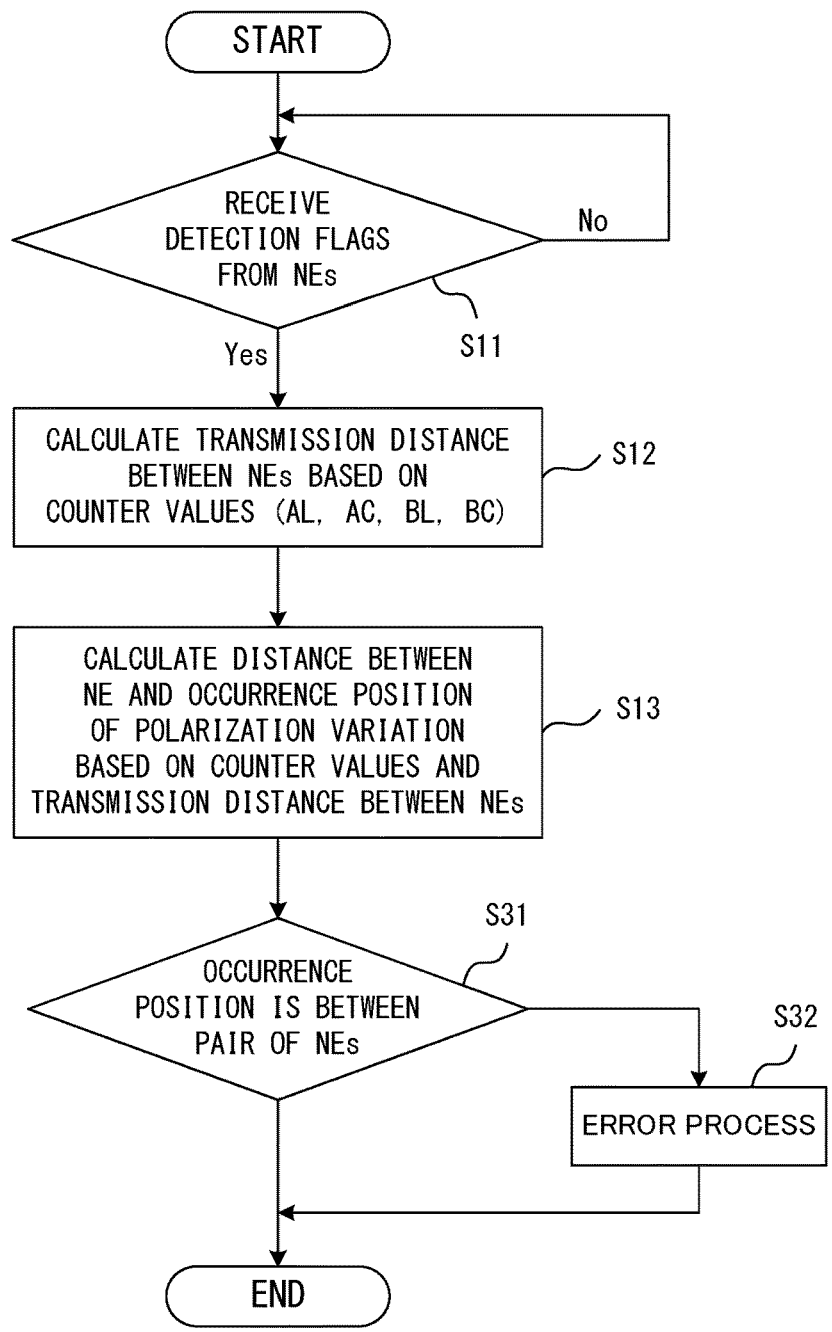
FIG. 11 is a flowchart illustrating another variation of the processing of the polarization variation monitoring device.

FIG. 11 is a flowchart illustrating another variation of the processing of the polarization variation monitoring device 2. Note that the processes of S11-S13 are substantially the same in FIG. 5 and FIG. 11. That is, the process of S31 is performed after S11-S13 in a sequence illustrated in FIG. 11.

In S31, the position detector 22 decides whether the occurrence position of the of the polarization variation that is calculated in S11-S13 is obtained between the optical transmission devices 1A and 1B. When the occurrence position of the of the polarization variation is not obtained between the optical transmission devices 1A and 1B, the position detector 22 performs an error process in S32. The error process includes a process to output a message indicating the calculation result is not appropriate.

Method of Detecting Polarization Variation

In this embodiment, the polarization variation is calculated, as described above, by using tap coefficients of a digital filter (the adaptive equalizer 33 in FIG. 3) that equalizes a received optical signal. In this case, a polarization state (or polarization angle) P1 is calculated based on the tap coefficients at time T and a polarization state P2 is calculated based on the tap coefficients at time T+ΔT. Then a polarization variation speed is calculated by dividing a difference between the polarization state P1 and the polarization state P2 by ΔT. Note that the polarization variation monitor 15 (15A, 15B) continuously monitors the polarization variation speed using the received optical signal.

Figure 12:
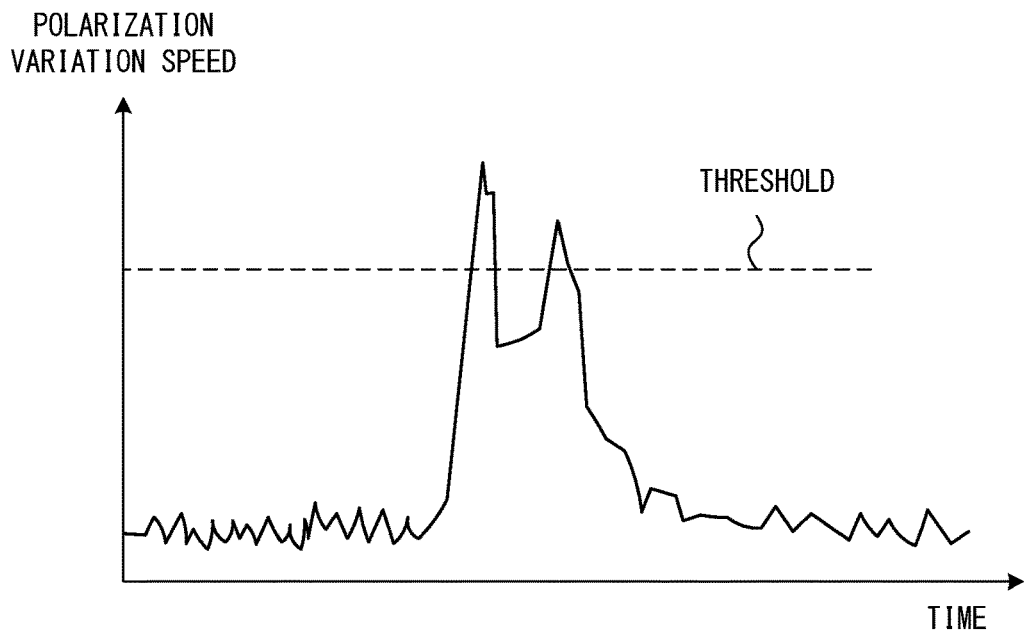
FIG. 12 illustrates an example of polarization variation speed monitored by the polarization variation monitor.

FIG. 12 illustrates an example of polarization variation speed monitored by the polarization variation monitor 15. The polarization variation monitor 15 may decide that a polarization variation occurs on an optical transmission line between the optical transmission devices 1A and 1B when the polarization variation speed exceeds a specified threshold. However, a plurality of peaks of the polarization variation speed may appear for a single polarization variation factor (such as a lightning strike, heavy vehicle passing or the like). In this case, it may be difficult to accurately calculates the occurrence position of the polarization variation.

Figure 13A:
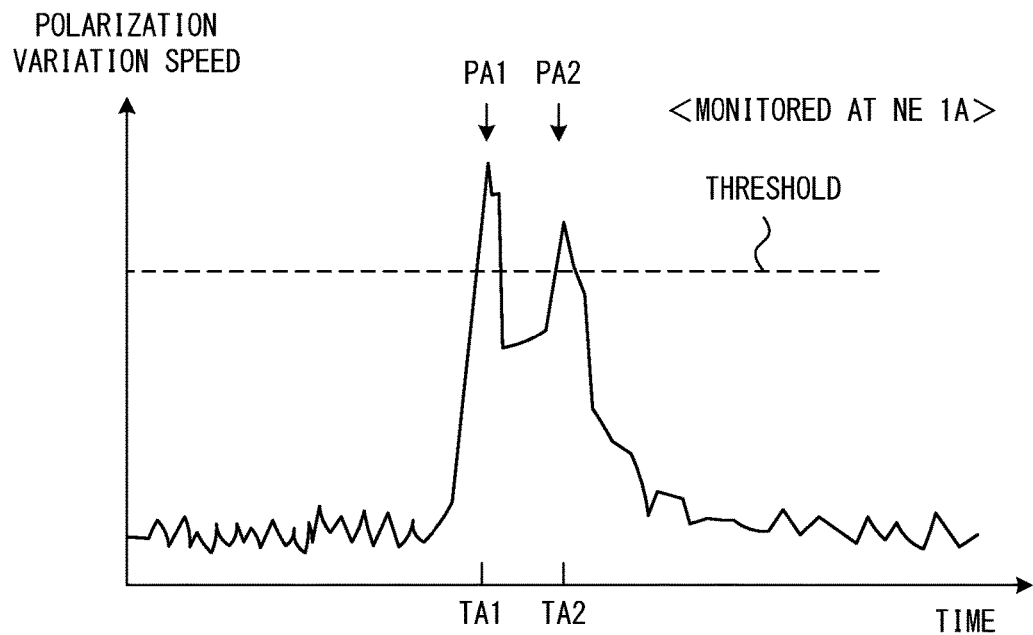
FIGS. 13A and 13B illustrate an example of a case in which it is difficult to calculate an occurrence position of a polarization variation.
Figure 13B:
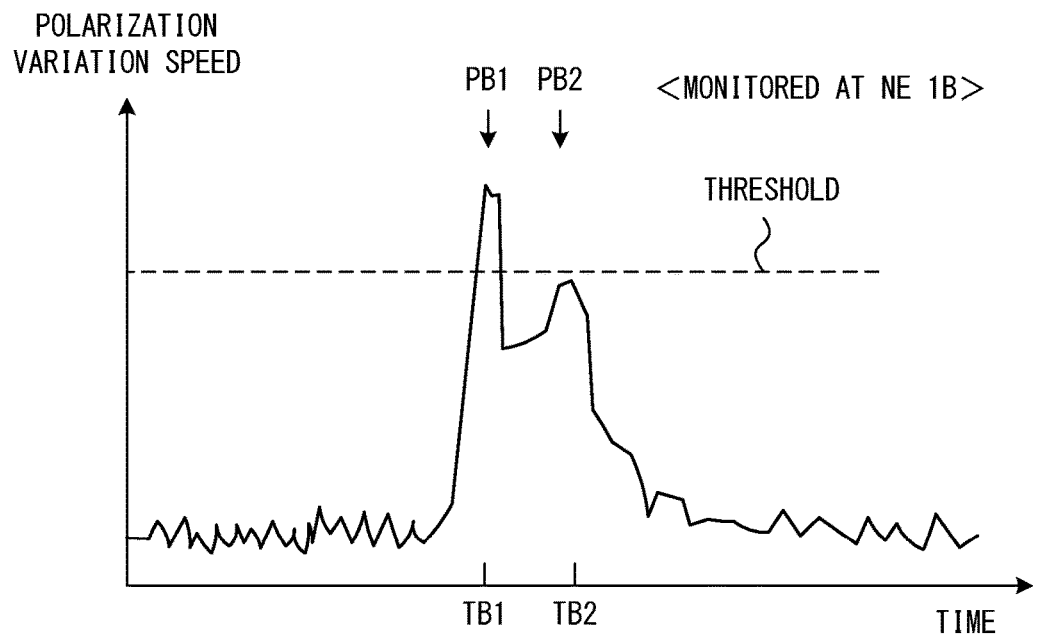

FIGS. 13A and 13B illustrates an example of a case in which it is difficult to calculate an occurrence position of a polarization variation. Specifically, FIG. 13A indicates a polarization variation speed monitored by the polarization variation monitor 15A in the optical transmission device 1A, and FIG. 13B indicates a polarization variation speed monitored by the polarization variation monitor 15B in the optical transmission device 1B. Note that it is assumed that an optical fiber that propagates an optical signal from the optical transmission device 1A to the optical transmission device 1B and an optical fiber that propagates an optical signal from the optical transmission device 1B to the optical transmission device 1A are accommodated in a common cable. Thus, when a polarization variation factor is given to the optical transmission line between the optical transmission devices 1A and 1B, the polarization variation monitor 15A and the polarization variation monitor 15B detect the same phenomenon (namely, polarization variation).

In the example illustrated in FIGS. 13A, a peak PA1 appears at time TA1 and a peak PA2 appears at time TA2 in the monitoring by the polarization variation monitor 15A. Similarly, in the example illustrated in FIGS. 13B, a peak PB1 appears at time TB1 and a peak PB2 appears at time TB2 in the monitoring by the polarization variation monitor 15B. Each of the polarization variation monitors 15A and 15B decides that a polarization variation occurs on an optical transmission line when the polarization variation speed exceeds a threshold, and transmits corresponding counter values to the polarization variation monitoring device 2. In this case, the polarization variation monitoring device 2 calculates an occurrence position of the polarization variation using counter values when the peak PA1 is detected by the polarization variation monitors 15A and counter values when the peak PB1 is detected by the polarization variation monitors 15B.

However, the polarization variation speed calculated in the optical transmission device 1A using an optical signal transmitted from the optical transmission device 1B to the optical transmission device 1A does not exactly match the polarization variation speed calculated in the optical transmission device 1B using an optical signal transmitted from the optical transmission device 1A to the optical transmission device 1B. That is, there may be an error. In the example illustrated in FIGS. 13A and 13B, the peak PA2 detected in the optical transmission device 1A is higher than the threshold, whereas the peak PB2 detected in the optical transmission device 1B is lower than the threshold. In this case, the optical transmission device 1A transmits counter values at time TA2 to the polarization variation monitoring device 2, but the optical transmission device 1B does not transmit counter values at time TB2 to the polarization variation monitoring device 2.

Here, as described with reference to FIG. 5, the polarization variation monitoring device 2 calculates the occurrence position of the polarization variation using counter values received from a pair of the optical transmission devices 1A and 1B. However, in the example illustrated in FIGS. 13A and 13B, the polarization variation monitoring device 2 obtains counter values detected at time TA1 by the optical transmission device 1A, counter values detected at time TA2 by the optical transmission device 1A, and counter values detected at time TB1 by the optical transmission device 1B. In this case, the counter values obtained from the optical transmission device 1A and the counter values obtained from the optical transmission device 1B may not be paired correctly. When the counter values are not paired correctly, the polarization variation monitoring device 2 cannot calculate the occurrence position of the polarization variation correctly. Specifically, when the counter values at time TA1 and the counter values at time TB1 are paired, the occurrence position of the polarization variation is calculated correctly. However, when the counter values at time TA2 and the counter values at time TB1 are paired, the occurrence position of the polarization variation is calculated incorrectly. Thus, according to a method in which a polarization variation is detected using only an absolute value of the polarization variation speed, the occurrence position of the polarization variation may not be calculated correctly.

The polarization variation monitor 15 (15A, 15B) according to the embodiment of the present invention has a function to solve this problem. For example, the polarization variation monitor 15A monitors the polarization variation speed of an optical signal received from the optical transmission device 1B. During this monitoring, the polarization variation monitor 15A outputs the detection flag that indicates a detection of the polarization variation, when an amount of change from the polarization variation speed at a first time to the polarization variation speed at a second time is larger than a first threshold and the polarization variation speed exceeds a second threshold.

Figure 14:
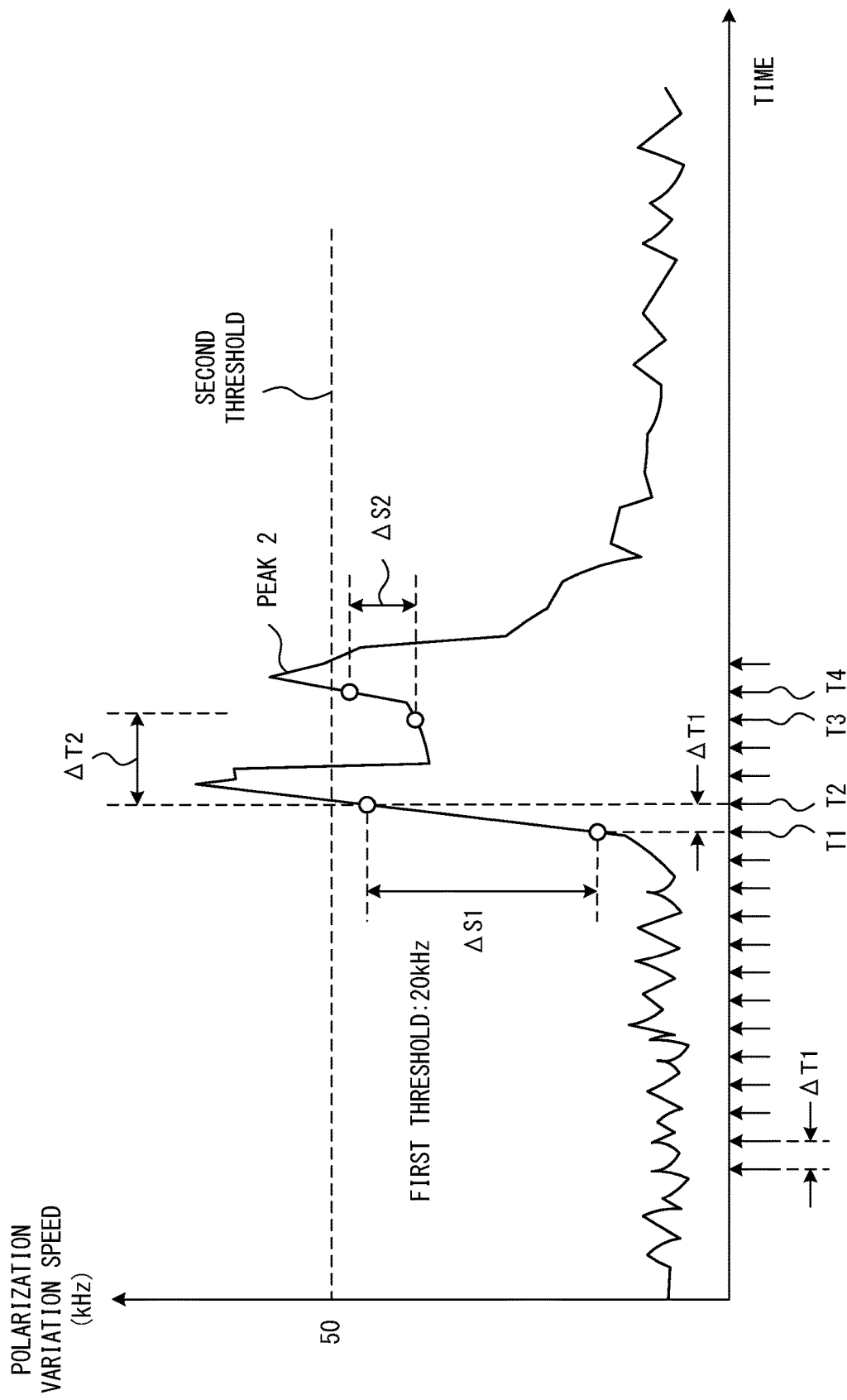
FIG. 14 illustrates an example of a method to detect a polarization variation.

FIG. 14 illustrates an example of a method to detect a polarization variation. Here, the polarization variation monitor 15 continuously monitors the polarization variation speed using a received optical signal. During this monitoring, when a polarization variation caused by an external factor such as lightning strike does not occur (that is, in a stable state), the polarization variation speed is stable with in a small value range. In the example illustrated in FIG. 14, the polarization variation speed is lower than 10 kHz in the stable state.

When a polarization variation factor (such as a lightning strike, heavy vehicle passing or the like) is given, the polarization variation speed rapidly or instantaneously increases. In the example illustrated in FIG. 14, after time T1, the polarization variation speed rapidly increases and exceeds 50 kHz. Thus, by detecting a phenomenon in which the polarization variation speed rapidly increases from the stable state and exceeds a specified threshold, it is considered that an occurrence of the polarization variation caused by an external factor such as lightning strike can be recognized.

The polarization variation monitor 15 periodically calculates an amount of change in the polarization variation speed. For example, a difference between the polarization variation speed at time T and the polarization variation speed at time T+$\Delta$T1 is calculated. Then the amount of change in the polarization variation speed is calculated by dividing the difference by $\Delta$T1.

The polarization variation monitor 15 continuously calculates the amount of change in the polarization variation speed, and compares the amount of change in the polarization variation speed per unit time with a first threshold specified in advance. Although it is not limited, the unit time $\Delta T1$ may be 2 micro seconds and the first threshold may be 20 kHz. In this case, the polarization variation monitor 15 monitors whether the amount of change in the polarization variation speed per unit time exceeds 20 kHz. In the example illustrated in FIG. 14, $\Delta S1$ that indicates the amount of change from the polarization variation speed at time T1 to the polarization variation speed at time T2 (=T1+$\Delta T1$) exceeds the first threshold (20 kHz).

When the change in the polarization variation speed that exceeds the first threshold is detected, the polarization variation monitor 15 decides whether an absolute value of the polarization variation speed exceeds a second threshold within a specified duration immediately after the detection. The second threshold is 50 kHz in the example illustrated in FIG. 14. Although it is not particular limited, it is preferable that the specified duration $\Delta T2$ is shorter than an interval between phenomena that cause the polarization variation may occur. In the example illustrated in FIG. 14, $\Delta S1$ that indicates the amount of change in the polarization variation speed per unit time is larger than the first threshold (that is 20 kHz) during time T1-T2, and immediately after that, the absolute value of the polarization variation speed exceeds the second threshold (that is 50 kHz). In this case, the polarization variation monitor 15 outputs the detection flag that indicates a detection of the polarization variation. Then the counter values are transmitted from the optical transmission device to the polarization variation monitoring device 2.

As described above, the polarization variation monitor 15 according to the embodiment of the present invention outputs the detection flag when the amount of change in the polarization variation speed per unit time is larger than the first threshold and then the polarization variation speed exceeds the second threshold. Thus, unnecessary or improper detection flags are suppressed. For example, in the example illustrated in FIG. 14, the peak 2 that appears immediately after time T4 exceeds the second threshold (that is 50 kHz). However, $\Delta S2$ that indicates the amount of change during T3-T4 immediately before the peak 2 is smaller than the first threshold (that is 20 kHz). In this case, the polarization variation monitor 15 does not output the detection flag. Thus, the counter values are not transmitted from the optical transmission device to the polarization variation monitoring device 2. As a result, in the polarization variation monitoring device 2, inappropriate pairing as explained with reference to FIGS. 13A and 13B is avoided or suppressed. Therefore, calculation accuracy for the occurrence position of the polarization variation is improved.

Figure 15:
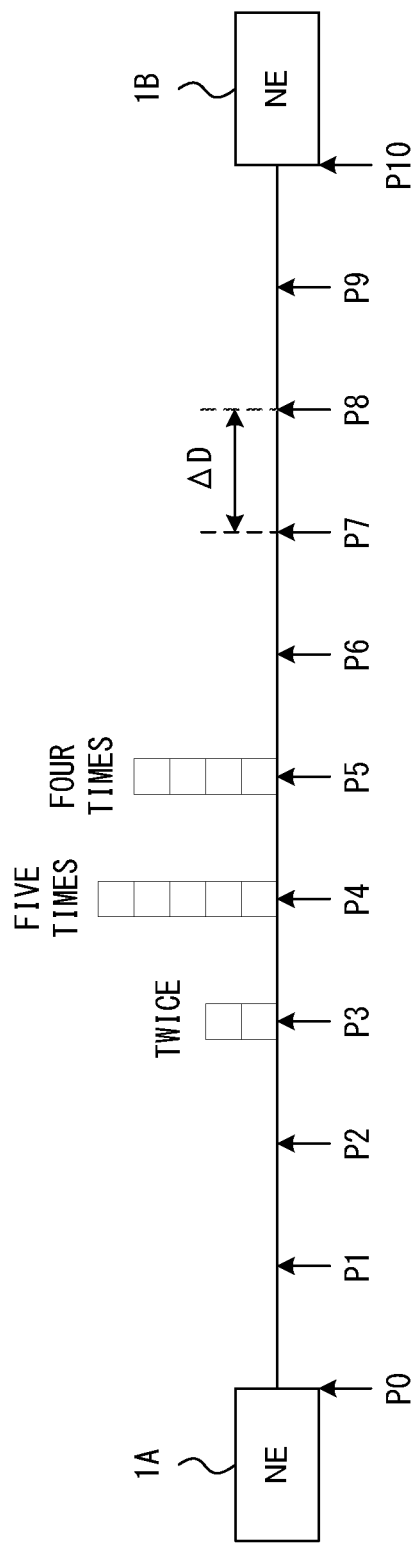
FIG. 15 illustrates an example of a statistical processing by the position detector.

FIG. 15 illustrates an example of a statistical processing by the position detector 22. Note that when the polarization variation monitoring device 2 obtain a plurality sets of counter values (AL, AC, BL, and BC), the position detector 22 determines a plurality of occurrence positions of the polarization variation respectively for the plurality sets of counter values. Then the position detector 22 performs a statistical processing for the plurality of occurrence positions and outputs the result.

In this example, the position detector 22 determines the occurrence position eleven times. As a result, twice of calculation results that indicate the polarization variation occurs at the position P3, five times of calculation results that indicate the polarization variation occurs at the position P4, and four times of calculation results that indicate the polarization variation occurs at the position P5 are obtained. Note that, as explained with reference to FIG. 6, each of the cycle of the counter 12A and 12B is 500 ns, and a granularity of the calculated position ($\Delta D$ in FIG. 15) is 100 meters.

The position detector 22 performs a statistical processing for the plurality of occurrence positions and outputs the result. The statistical processing is realized by, for example, obtaining a median of the plurality of occurrence positions. In this case, for example, a sixth calculation result counting from a calculation result closest to the optical transmission device 1A is determined as the occurrence position of the polarization variation. In this example, position P4 is determined. The statistical processing may be realized by obtaining the calculation result with the highest frequency. Also in this case, position P4 is determined as the occurrence position of the polarization variation. Furthermore, the statistical processing may be realized by calculating an average of distances from the optical transmission device 1A to the respective occurrence positions. In this case, "418 meters" is obtained by the calculation below.

$$\text{Distance} = (2 \times 300 + 5 \times 400 + 4 \times 500)/11$$

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A polarization variation monitoring system for determining an occurrence position of a polarization variation using a polarization variation monitoring device in an optical network in which a first optical transmission device and a second optical transmission device transmit frames bidirectionally via an optical transmission path, wherein the first optical transmission device includes
 a first detector configured to detect a polarization variation using an optical signal received from the second optical transmission device;
 a first counter configured to generate a counter value that is incremented in a specified cycle;
 a first transmitter configured to transmit a frame including the counter value generated by the first counter to the second optical transmission device; and
 a first extractor configured to extract a counter value from a frame received from the second optical transmission device, and the second optical transmission device includes
 a second detector configured to detect a polarization variation using an optical signal received from the first optical transmission device;
 a second counter configured to generate a counter value that is incremented in the cycle;
 a second transmitter configured to transmit a frame including the counter value generated by the second counter to the first optical transmission device; and
 a second extractor configured to extract the counter value from a frame received from the first optical transmission device, and the polarization variation monitoring device includes a processor configured to
 acquires a first counter value indicative of the counter value generated by the first counter and a second counter value indicative of the counter value extracted by the first extractor when the first detector detects the polarization variation, and a third counter value indicative of the counter value generated by the second counter and a fourth counter value indicative of the counter value extracted by the second extractor when the second detector detects the polarization variation, and determine an occurrence position of the polarization variation based on the first counter value, the second counter value, the third counter value and the fourth counter value.

2. The polarization variation monitoring system according to claim 1, wherein the processor calculates a first difference value indicative of a difference between the first counter value and the second counter value, and a second difference value indicative of a difference between the third counter value and the fourth counter value, the processor calculates the number of steps representing a transmission distance between the first optical transmission device and the second optical transmission device by dividing an absolute value of a difference between the first difference value and the second difference value by 2, and based on the second counter value, the third counter value and the number of steps representing the transmission distance, the processor calculates a transmission distance between the first optical transmission device or the second optical transmission device and the occurrence position of the polarization variation.

3. The polarization variation monitoring system according to claim 2, wherein the processor generates a first calculation value by subtracting a value obtained by multiplying the number of steps representing the transmission distance by 2 from the third counter value, the processor generates a second calculation value by dividing a value obtained by subtracting the first calculation value from the second counter value by 2, and based on the second calculation value, the processor calculates the transmission distance between the first optical transmission device or the second optical transmission device and the occurrence position of the polarization variation.

4. The polarization variation monitoring system according to claim 3, wherein the processor calculates the transmission distance between the first optical transmission device or the second optical transmission device and the occurrence position of the polarization variation by multiplying a distance by which light propagates via the optical transmission path during the specified cycle by the second calculation value.

5. The polarization variation monitoring system according to claim 1, wherein the processor calculates a first position indicative of the occurrence position of the polarization variation based on the second counter value and the third counter value, the processor calculates a second position indicative of the occurrence position of the polarization variation based on the first counter value and the fourth counter value, and when the first position and the second position coincide with each other, the processor outputs information indicative of the first position or the second position.

6. The polarization variation monitoring system according to claim 1, wherein the first detector monitors a polarization variation speed of the optical signal received from the second optical transmission device, and outputs a detection flag that indicates a detection of the polarization variation when an amount of change from the polarization variation speed at a first time to the polarization variation speed at a second time is larger than a first threshold and the polarization variation speed exceeds a second threshold, and the first optical transmission device transmits the first counter value and the second counter value to the polarization variation monitoring device when the detection flag is output from the first detector.

7. The polarization variation monitoring system according to claim 1, wherein when the processor acquires a plurality sets of the first counter value, the second counter value, the third counter value, and the fourth counter value, the processor determines a plurality of occurrence positions of the polarization variation respectively for the plurality sets, and the process or performs a statistical processing for the plurality of occurrence positions and outputs the result of the statistical processing.

8. A polarization variation monitoring method of determining an occurrence position of a polarization variation using a polarization variation monitoring device in an optical network in which a first optical transmission device and a second optical transmission device transmit frames bidirectionally via an optical transmission path, wherein the first optical transmission device monitors a polarization variation using an optical signal received from the second optical transmission device, increments a first counter in a specified cycle, transmits a frame including the counter value generated by the first counter to the second optical transmission device, and extracts a counter value from a frame received from the second optical transmission device, the second optical transmission device monitors a polarization variation using an optical signal received from the first optical transmission device, increments a second counter in the cycle, transmits a frame including the counter value generated by the second counter to the first optical transmission device, and extracts a counter value from a frame received from the first optical transmission device, and the polarization variation monitoring device acquires a first counter value indicative of the counter value generated by the first counter and a second counter value indicative of the counter value extracted by the first optical transmission device when the first optical transmission device detects the polarization variation, and a third counter value indicative of the counter value generated by the second counter and a fourth counter value indicative of the counter value extracted by the second optical transmission device when the second optical transmission device detects the polarization variation, and determines an occurrence position of the polarization variation based on the first counter value, the second counter value, the third counter value and the fourth counter value.

* * * * *